United States Patent
Kloots

[11] 3,933,409
[45] Jan. 20, 1976

[54] BIFURCATED FIBEROPTIC ADAPTORS
[75] Inventor: Jacobus Kloots, Sturbridge, Mass.
[73] Assignee: Applied Fiberoptics, Inc., Southbridge, Mass.
[22] Filed: Oct. 7, 1974
[21] Appl. No.: 512,626

[52] U.S. Cl. ............... 350/96 B; 350/96 C
[51] Int. Cl.² ........................... G02B 5/16
[58] Field of Search ........... 350/96 B, 96 C; 128/23

[56] References Cited
UNITED STATES PATENTS

| | | | |
|---|---|---|---|
| 3,423,581 | 1/1969 | Baer | 350/96 B |
| 3,453,036 | 7/1969 | Swope et al. | 350/96 C |
| 3,457,000 | 7/1969 | Genahr | 350/96 C |
| 3,618,526 | 11/1971 | Baker | 350/96 B UX |
| 3,775,606 | 11/1973 | Bazell et al. | 350/96 B X |

*Primary Examiner*—James B. Mullins
*Attorney, Agent, or Firm*—Thomas N. Tarrant

[57] ABSTRACT

Adaptors in combination with light sources for distributing light over fiberoptic cables, each adaptor housing a fiberoptic bifurcated segment for receiving light from the source at one end and dividing between two or more separate outputs at the other end. Permanently mountable adaptors, pluggable adaptors, and adaptors with permanently affixed cables are disclosed.

5 Claims, 5 Drawing Figures

BIFURCATED FIBEROPTIC ADAPTORS

BACKGROUND OF THE INVENTION

1. Field of the Invention

The present invention relates to apparatus for providing light from a source along flexible fiberoptic cables and particularly to such apparatus including adaptors using bifurcated fiberoptic segments for splitting light from a source between a plurality of terminal illuminating devices.

2. Description of the Prior Art

In surgical medicine today, fiberoptics has come to play an important role in providing illumination to previously inaccessible areas as well as better controlled illumination to previously accessible areas. An example of the latter is the surgeon's headlamp. Since, during a surgical operation, continuous performance of all equipment is critical, light sources feeding fiberoptic cables for medical use commonly have provision for an immediate changeover in case of failure of a lightbulb. Some sources have two or more lightbulbs that may be switched into position by a panel switch while others have two or more complete light sources within the same housing selectable by a panel switch simultaneously or in the alternative.

In surgical use, it is not uncommon to require fiberoptic illumination for two or more devices simultaneously. For example, in eye operations, an ophthalmascope and a surgical microscope. In abdominal surgery, a headlamp and a retractor with integral illuminating may both be required. Either an additional light source is require or a twin light source loses its insurance aspect of an alternative source on failure.

SUMMARY OF THE INVENTION

In accordance with the present invention, light sources for fiberoptic cables are provided with adaptors whereby a single source may be divided along two or more paths to provide light to a plurality of devices and locations. These adaptors include fiberoptic cables or bundles gathered to a single face at one end and bifurcated to two faces at the other end. A variety of housings for the cables or bundles are designed for permanent attachment to a light source, for plug-in attachment to a light source and for permanently attached fiberoptic cables or plug-in attached fiberoptic cables. The adaptors in combination with a light source provide a flexible multiplicity of light outputs to a plurality of devices at remote locations. Thus, it is an object of the invention to provide a light source for distributing light over fiberoptic cables with a multiplicity of light output connections for distribution to a variety of devices. It is a further object of the invention to provide a novel distribution system for light from a source through fiberoptic cables. It is still a further object of the invention to provide a novel bifurcated fiberoptic adaptor for dividing the light output from a source along two or more paths.

Further objects and features of the invention will become apparent upon reading the following description together with the Drawing. BRIEF DESCRIPTION OF THE DRAWING.

DESCRIPTION OF THE PREFERRED EMBODIMENTS

Figure 1:
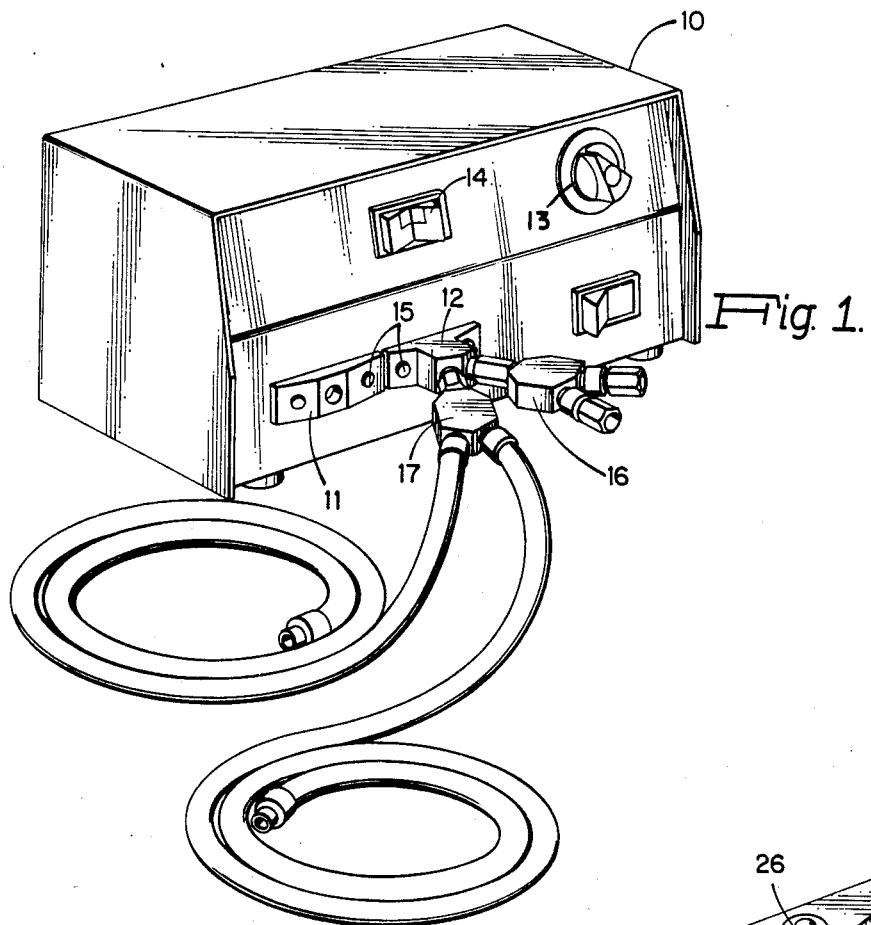
FIG. 1 is a perspective view of light source apparatus with adaptors according to the invention connected.

While light sources for fiberoptics may take many forms, a preferred arrangement for surgical purposes has two nearly independent sources of light in a single unit making it possible to cover nearly all possible failures by switching the unit from one source to the other as can be done in twin source 10 of FIG. 1. Source 10 has a first light output at socket 11 and a second light output at permanently mounted bifurcated adapter 12. Internally source 10 has two independent light units selectable by switches 14. Intensity control 13 varies the intensity of the selected light unit or units in a conventional manner permitting intensity correction when the light is reduced by division along several paths. While adaptor 12 is described as permanently mounted, mounting is by means of screws 15 permitting change if desired. Adaptor 12 is in accordance with FIG. 2 while connected to one output socket of adaptor 12 is plug-in adaptor 16 according to FIG. 4. Connected to the other output socket of adaptor 12 is adaptor 17 with permanently affixed cables as in FIG. 5.

The units (not illustrated) inside source 10 are arranged in conventional manner to focus their illumination on the polished ends of fiber bundles mounted to the front of source 10.

Figure 2:
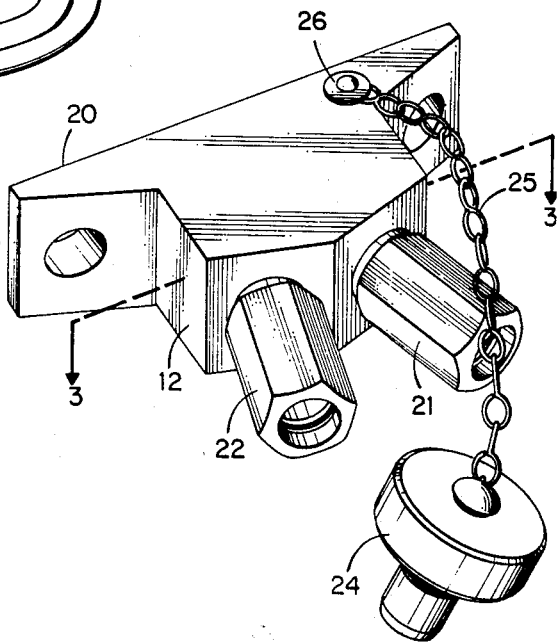
FIG. 2 is a perspective view of a one embodiment of the invention.

FIG. 2 depicts screw mounted bifurcated adaptor 12. At the receiving end, surface 20 is flush for mounting to the front panel of source 10. Two output connectors 21 and 22 are depicted as separated by a 30° angle for connection of separate fiberoptic cables. Since the unit of FIG. 2 is for permanent mounting, on occasion it will be used with only one output device. For this purpose, it is desirable to block the unused output with a protective dust cover. Thus, termination plug 24 is connected to adaptor 12 by small chain 25 secured by stud 26.

Figure 3:
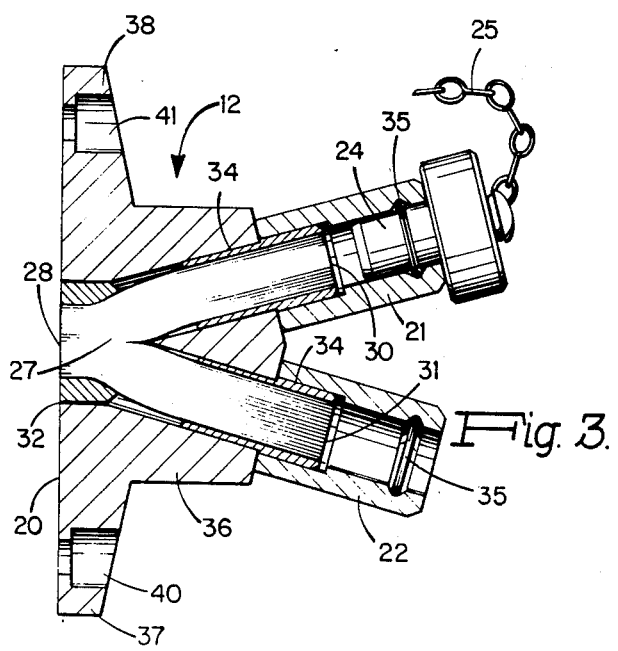
FIG. 3 is a cross section taken along 3—3 of FIG. 2.

FIG. 3 is a cross-sectional view of adaptor 12 showing the bifurcated fiberoptic bundle. Fiberoptic bundle 27 typically contains about 15,000 glass fibers which are cemented together in a single polished receiving face 28 at one end and are separated into two groups each cemented together at a polished transmitting face 30, 31. The number of fibers is not critical and while the separation will commonly distribute substantially half the fibers to face 30 and the other half to face 31, uneven distributions can be made where desired to operate devices requiring different illumination intensities. Cement 32 holds the receiving end of fiberoptic bundle 27 in place and cement 34 holds the transmitting ends of fiberoptics bundle 27 in place. Snaprings 35 serve to lock the plug-in ends of fiberoptic cables in adaptor 12. Housing 36 of adaptor 12 is cast or molded of metal or plastic and has extending legs 37 and 38 on each side that carry recesses 40 and 41 for mounting screws 15.

Figure 4:
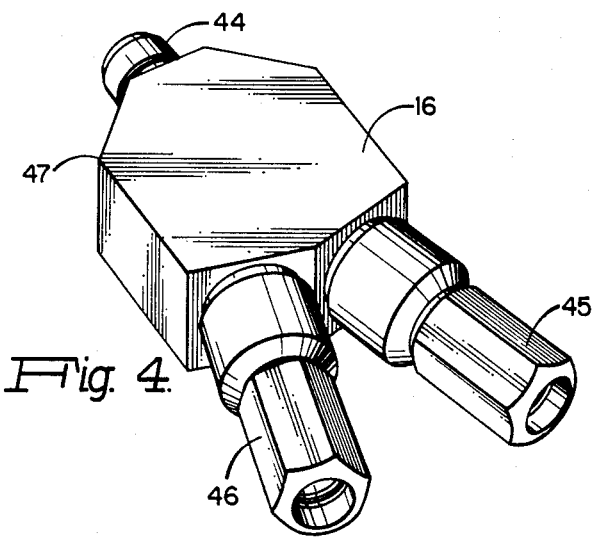
FIG. 4 is a plan view of a plug-in adaptor according to a second embodiment of the invention.

FIG. 4 depicts adaptor 16 having plug-in jack 44 at the receiving end and two plug-in receptacles 45 and 46 at the transmitting end similar to 21 and 22 of FIG. 2. Body 47 houses a bifurcated fiberoptic bundle similar to fiberoptic bundle 27, but extending into jack 44 at the receiving end.

Figure 5:
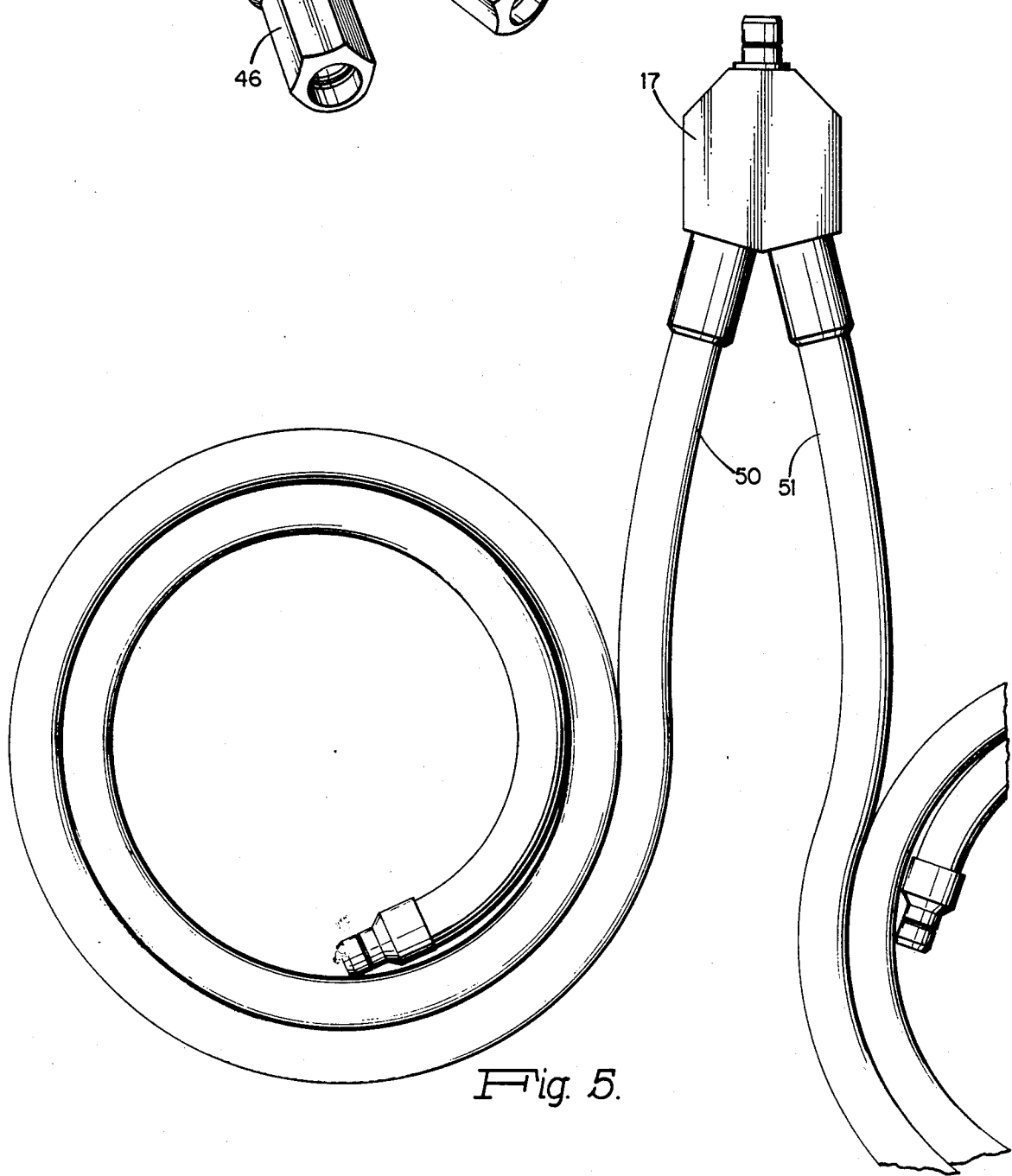
FIG. 5 is a plan view of a plug-in adaptor with permanently attached fiberoptic cables according to a third embodiment of the invention.

An adaptor with permanently attached fiberoptic cables is depicted as adaptor 17 in FIG. 5. Adaptor 17 is essentially similar to adaptor 16 except that receptacles 45 and 46 are replaced by permanently attached fiberoptic cables 50 and 51. While not illustrated, the receptacles 21 and 22 of adaptor 12 can also easily be replaced by permanently connected fiberoptic cables. In adaptor 17 the cable fibers do not run through the body of the adaptor, but are terminated within the adaptor with faces matching the faces of the internal bifurcated bundle. Again, the internal bifurcated bundle is essentially identical to that described with respect to FIG. 3.

In operation, each of the adaptors divides the received light along two equal paths. It will be recognized that by combining adaptors it is possible to separate the light from one output of source 10 into as many separate paths as desired. The loss in illumination intensity along each path due to dividing the light can be compensated at least partially by intensity controls in sources having provision for intensity control.

While the invention has been described with relation to specific embodiments, obvious variations are contemplated and it is the intention to cover the invention as set forth within the scope of the appended claims.

I claim:

1. In apparatus having a light source and an outlet connection, for piping light from said source through light conductors to a remote location, the combination with said outlet connection of a bifurcated fiberoptic adaptor comprising:
   a. a rigid body;
   b. a bifurcated fiberoptic bundle within said body consisting of multiple thousands of optical fibers all gathered together at a single receiving end and gathered in two groups at their opposite extremities to provide two transmitting ends;
   c. means to bond said fibers together at said receiving end both to each other and to said body;
   d. means to bond said fibers together in two groups at said transmitting ends both to each other and to said body;
   e. means integral with said body for mating said receiving end to said light source; and,
   f. means integral with said body for mating said transmitting ends to flexible fiberoptic cables, all for dividing the light along two separate paths to be piped to two separate locations.

2. In apparatus according to claim 1, the combination in which said light source is enclosed in a housing and said bifurcated adaptor is permanently secured to the exterior of said housing.

3. In apparatus according to claim 2, the combination in which said adaptor comprises a cast body, a fiberoptic bundle within said body, a single face comprising all the fibers in said bundle polished flush with said body on a surface secured to said housing, and two further faces each comprising substantially one half the fibers in said bundle terminating with polished surfaces within separate connector receptacles mounted to said body and directed away from said housing.

4. In apparatus according to claim 3, the combination in which said two further faces are separated by an angle of substantially 30°.

5. In apparatus according to claim 1, the combination in which said outlet connection includes a female connector and said bifurcated adaptor has a male connector at a first end, two female connectors at a second end and an internal fiberoptic bundle with one end of all fibers integrally terminated at said male connector, and the other end of the fibers terminated one-half at each of said two female connectors.

* * * * *